June 6, 1950   C. N. HICKMAN   2,510,110
STEP-MOTOR ROCKET PROJECTILE
Filed March 30, 1945   4 Sheets-Sheet 4
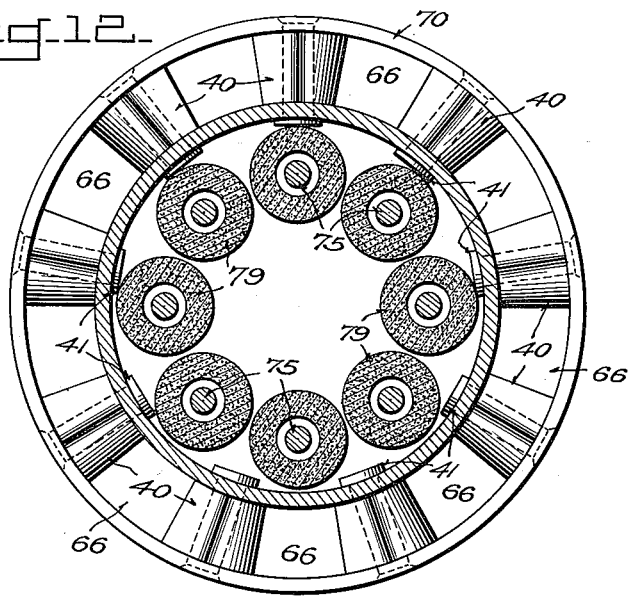
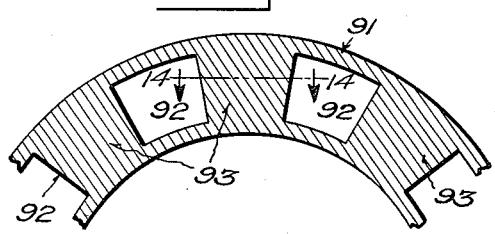
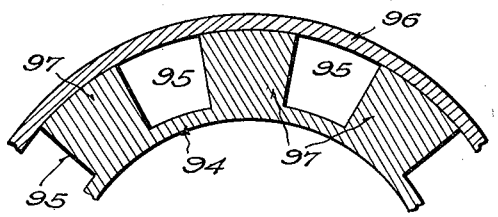
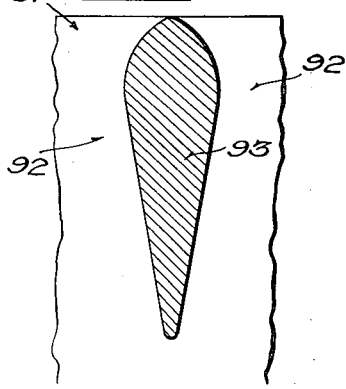
Inventor
CLARENCE N. HICKMAN, Patented June 6, 1950

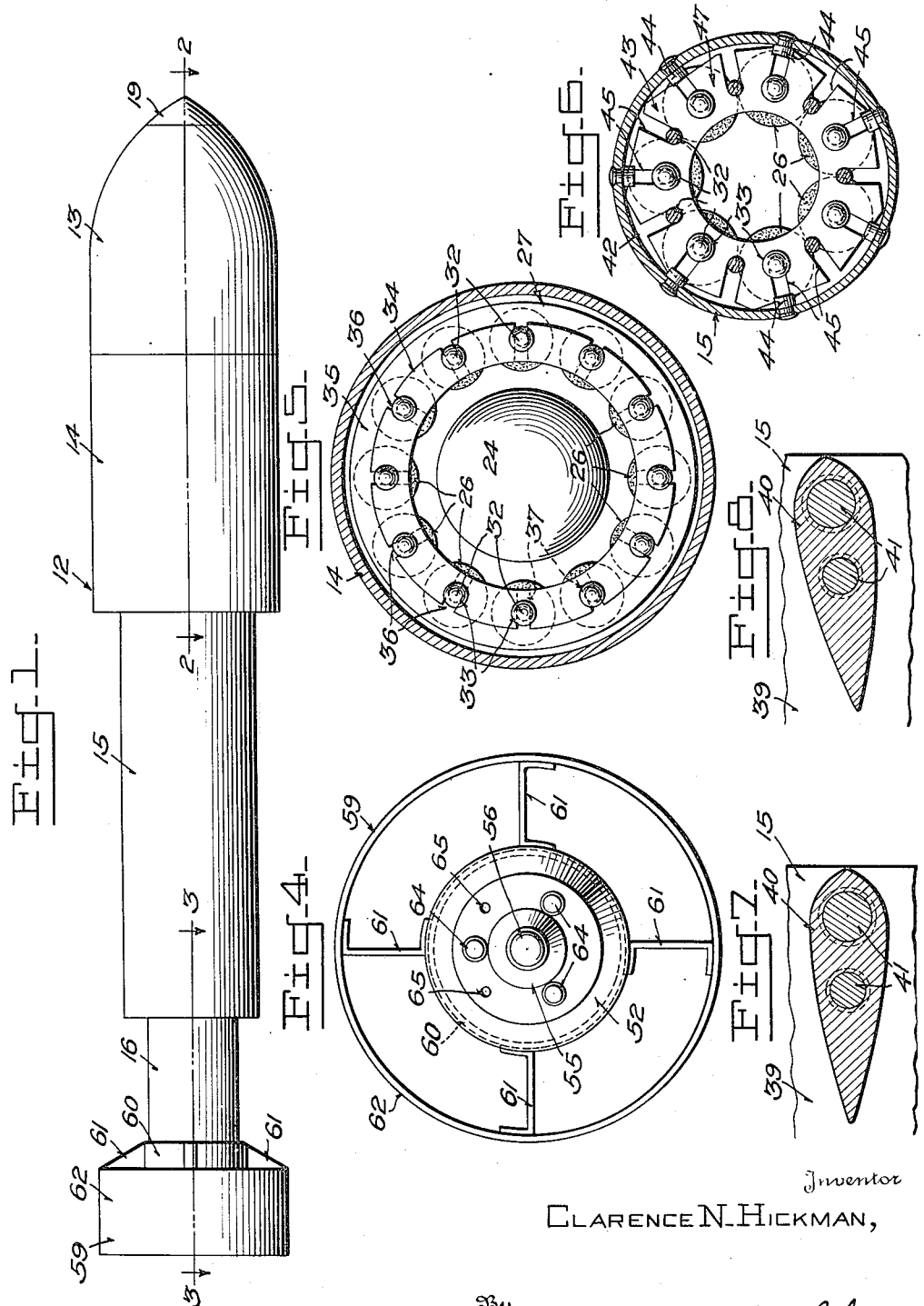

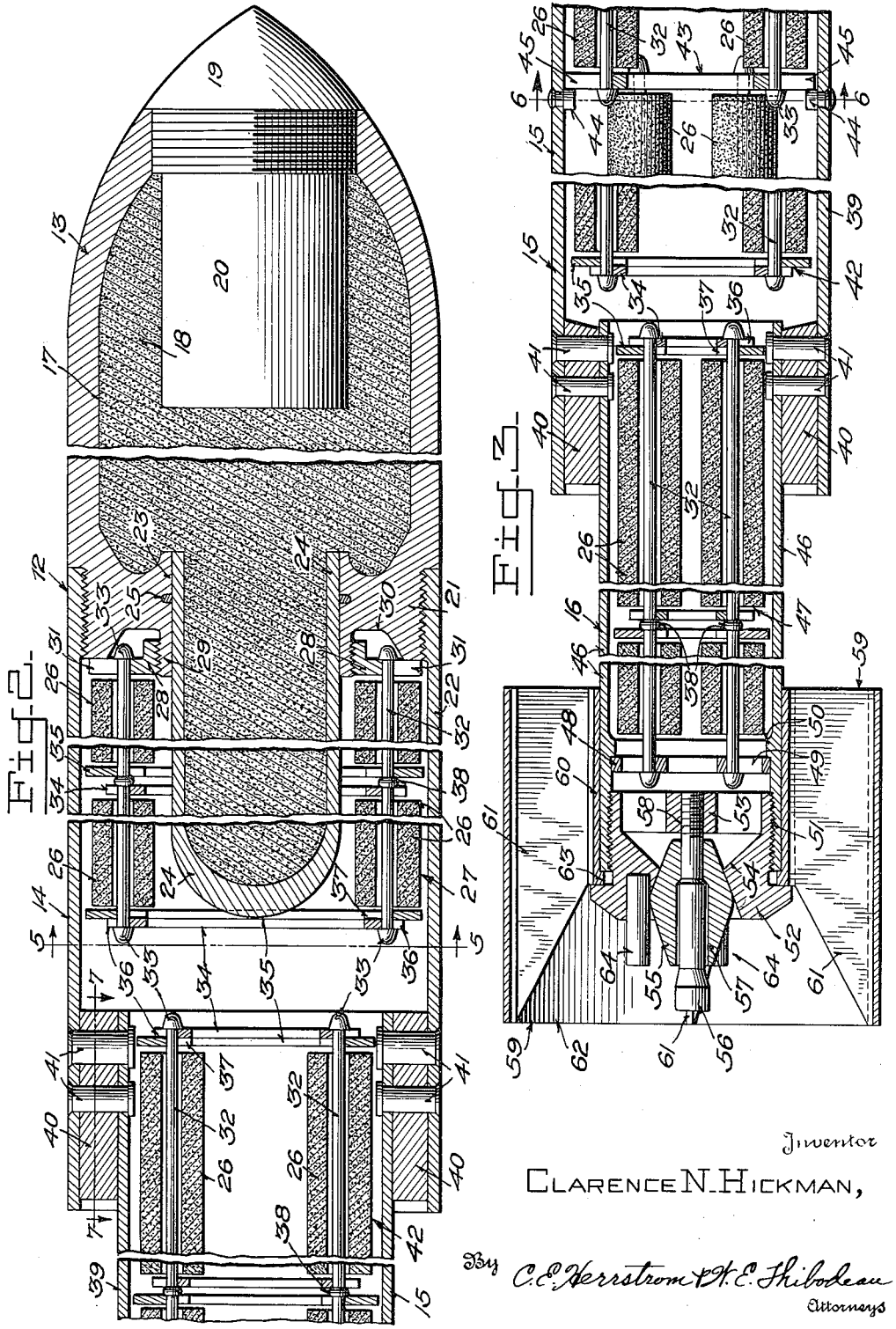

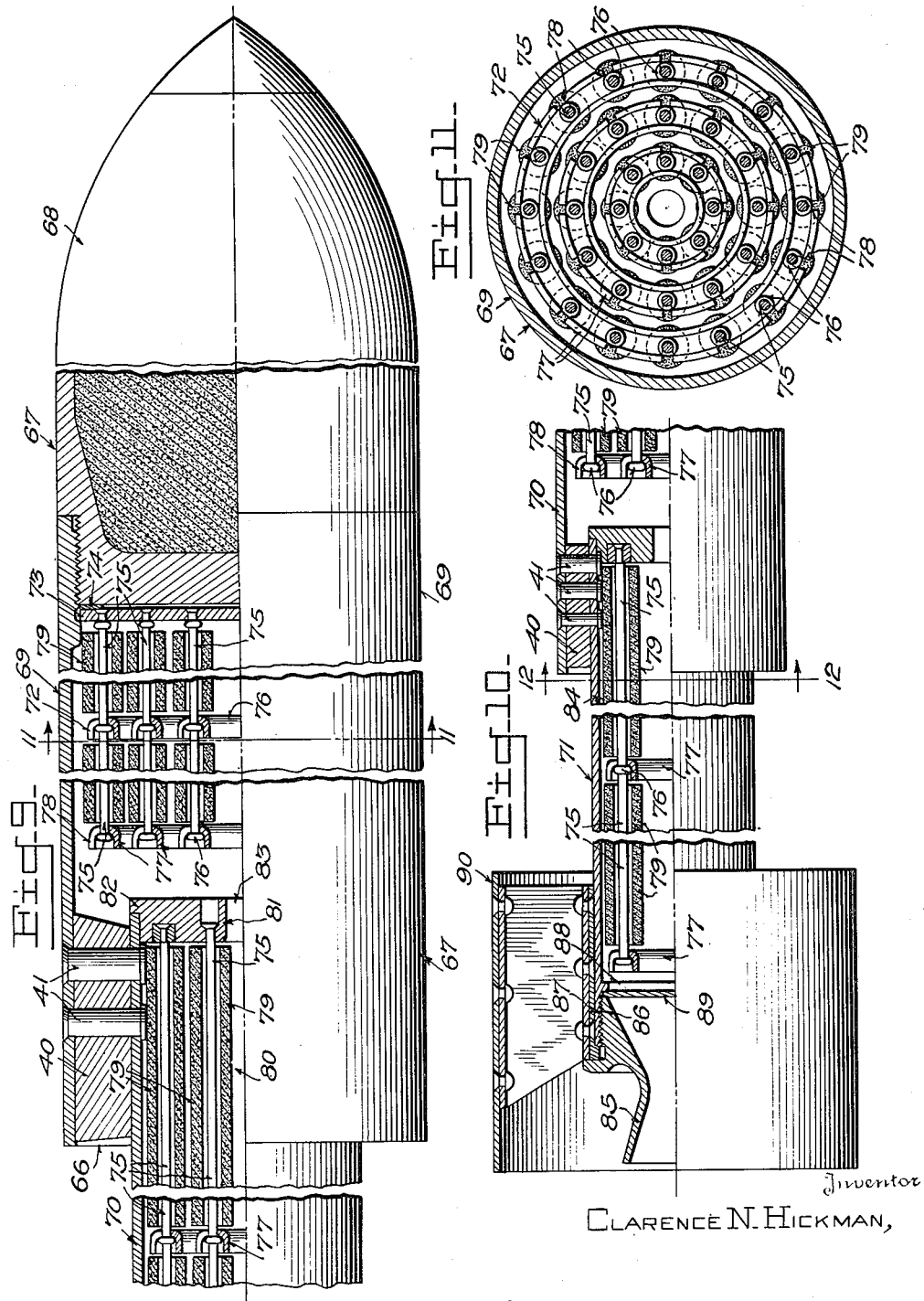

2,510,110

UNITED STATES PATENT OFFICE 2,510,110

STEP-MOTOR ROCKET PROJECTILE

Clarence N. Hickman, Jackson Heights, N. Y.

Application March 30, 1945, Serial No. 585,756

5 Claims. (Cl. 102—49)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in the rocket propulsion of projectiles or other bodies, and more particularly to a step-motor rocket in which the rocket motor has one or more annular series of nozzles or venturi at points along the length of the motor, at which point or points the diameter of the motor reduces in size.

In rockets of conventional design, the density of loading, and hence the performance, is limited by the necessity of providing an adequate port area of jets or nozzles to carry the flow of propellant gases.

It is therefore a primary aim of this invention to provide a step-motor rocket to overcome this limitation by providing the propellent gases with an opportunity to escape through multiple jets or nozzles which are circumferentially arranged and which may be spaced at various points along the length of the rocket motor.

Other objects of this invention are: to provide a rocket projectile construction which permits a high density of loading to attain a relatively high flight velocity and increased range; to provide a rocket-motor construction fabricated from a plurality of tubular sections of decreasing diameters which are overlapped to provide a plurality of axially spaced peripheral nozzles or venturi jets; to provide efficient nozzle or jet devices for securing the tubular step-motor rocket sections to one another; to provide a step-motor rocket having nozzles or jets which cause the rocket to be rotated at moderate speeds during launching; to provide a step-motor rocket projectile which when fabricated with an outside diameter of approximately four and one-half inches will be capable of carrying at least ten pounds of high explosive at velocities of the order of 1100 to 1300 feet per second.

Other objects and advantages of the invention will be readily apparent from the following description of the specific embodiments thereof illustrated in the accompanying drawings in which:

Figure 1 is a side elevational view of the step motor rocket;

Figures 2 and 3 are enlarged longitudinal sectional views taken substantially along the planes of the lines 2—2 and 3—3, respectively, of Figure 1;

Figure 4 is an end view in elevation looking toward the trailing end of the rocket;

Figure 5 is a cross sectional view of the rocket taken substantially along a plane as indicated by the line 5—5 of Figure 2;

Figure 6 is a cross sectional view of the rocket taken substantially along a plane as indicated by the line 6—6 of Figure 3;

Figure 7 is a longitudinal sectional view of one of the connecting elements taken substantially along a plane as indicated by the line 7—7 of Figure 2;

Figure 8 is a view similar to Figure 7 showing a modified position of the connection element;

Figure 9 is a fragmentary side elevational view, partly in section, of the forward end of a modified construction of the rocket;

Figure 10 is a view, similar to Figure 9, of the rear end of the modified rocket;

Figure 11 is a cross sectional view of the rocket shown in Figure 9 and taken substantially along a plane as indicated by the line 11—11 of Figure 9;

Figure 12 is an enlarged cross sectional view of the motor chamber taken substantially along a plane as indicated by the line 12—12 of Figure 10;

Figure 13 is a fragmentary circumferential sectional view of a modified form of connecting means;

Figure 14 is a sectional view of the modified connecting means taken substantially along a plane as indicated by the line 14—14 of Figure 13; and Figure 15 is a fragmentary circumferential sectional view of another form of connecting means.

Referring more particularly to the drawings, wherein like reference characters designate like or corresponding parts throughout the several views, 12 designates generally the step motor rocket, shown in Figures 1 to 8 in its entirety, and which includes a head 13, a forward motor chamber 14, an intermediate motor chamber 15 and a rear motor chamber 16.

As best seen in Figure 2 the head 13 is recessed to form a burster chamber 17 containing a charge 18 of high explosive. The forward end of the head 13 is open and internally threaded to receive and threadedly engage the neck of a detachable rocket nose 19 to which is connected a booster charge 20 which is disposed in a cavity of the charge 18. The rear end of the head 13 is reduced and threaded to form a neck 21 to which is threadedly connected the forward end of the cylindrical casing 22 of the forward motor chamber 14. The neck 21 is provided with a central opening 23 in which is mounted the forward, open end of a burster tube 24, which extends rearwardly through a substantial portion of the motor chamber 14 and which is closed at its rear end. The burster tube 24 opens into the burster chamber 17 and is likewise filled with the explosive charge 18. The forward end of the burster tube 24 may be secured in any manner in the opening 23, as by means of a bonding element 25.

The motor chamber 14 contains a plurality of sticks or grains of propelling powder 26 which are mounted around the burster tube 24 on a powder trap, designated generally 27. The powder trap 27 includes an internally threaded collar 28 which threadedly engages a restricted externally threaded portion 29 of the neck 21, formed by the annular recess 30, in neck 21, which opens rearwardly of said neck into the motor chamber 14 and which is disposed around the opening 23 thereof. The collar 28 is provided with a plurality of radially disposed outwardly opening notches or slots 31 each of which is adapted to receive an end portion of a supporting rod 32, which rods are provided with heads 33 at each end thereof. Each of the rods 32 has one of its heads 33 disposed in the recess 30 and abutting against the forward face of collar 28 to detachably connect the forward ends of the rods 32 to the supporting collar 28. The rods 32 support a pair of rings 34 and 35 at their rear ends which form abutments for the rear powder sticks 26 and which are held in place by the heads 33, at the rear ends of the rods 32. The rings 34 are provided with outwardly opening radial notches 36 and the rings 35 are provided with inwardly opening radial notches 37, for detachably mounting said rings on the rods 32. At one or more points intermediate of their ends, rods 32 are provided with enlargements 38, forming stops for additional sets of rings 34 and 35, one of which is disposed on either side of said enlargements 38, and which combined therewith to form spacing means for the powder sticks 26 carried by each of the rods 32. The trap 27 is adapted to be assembled with the powder sticks 26 thereon and thereafter attached to the neck 21 before the motor casing 22 is applied. It will be noted that as collar 28 is screwed onto threaded portion 29 the heads 33 of rods 32 are engaged and cammed radially inwardly by the outer frusto-conical surface of recess 30 whereby the forward ends of all rods are positively held against radial displacement out of their slots 31.

The motor casing 22 is of the same diameter as the head 13 and is a greater diameter than the casing 39 of the intermediate motor chamber 15. As best seen in Figure 2, the forward end of the motor casing 39 extends into the rear end of the motor casing 22 and is disposed concentric thereto and held thus positioned by means of a plurality of spacing elements 40 which are disposed between the telescoped ends of the casings 22 and 39 and which are fastened thereto by means of rivets or similar fastenings 41, which extend through the overlapped casing portions and through the spacing elements 40. As best seen in Figure 7, the spacing elements 40 are rounded at their forward ends and are provided with elongated tapered rear portions, for the purpose hereinafter to become apparent. The intermediate motor chamber 15 is provided with a powder trap, designated generally 42, for supporting a plurality of additional powder sticks 26. The powder trap 42 includes a supporting ring 43, as best seen in Figure 6, which is suitably secured, as by welding, to a plurality of circumferentially spaced inwardly projecting studs 44 in the motor chamber 15 and intermediate the ends thereof. The ring 43 is provided with a plurality of circumferentially spaced outwardly opening radial slots or notches 45 adapted to receive a plurality of additional rods 32 which alternately extend rearwardly and forwardly therefrom for supporting the powder sticks 26, which are held in engagement with the ring 43 by their heads 33. The opposite ends of the rods 32, as seen in Figures 2 and 3, support sets of rings 34 and 35 in the same manner as the rods 32 of the trap 27; and the rods of the trap 42 are also provided with enlargements 38 (Figure 2) which function with additional rings 34 and 35 for spacing the powder sticks 26, in the same manner as previously described in the description of the trap 27.

The rear motor chamber 16 is provided with a casing 46 the forward end of which is disposed concentrically within the rear end of the motor casing 39. The motor casing 46 is substantially smaller in diameter than the motor casing 39 and its forward end is connected to and mounted within the rear end of the casing 39 by spacing elements 40 and rivets 41, in the same manner that casing 39 is connected to the motor casing 22. The motor casing 46 contains a plurality of powder sticks 26 which are supported on a powder trap, designated generally 47, which corresponds to the powder trap 27, except that it is supported at its rear end instead of its forward end, and by a supporting ring 48 instead of the collar 28. The ring 48 is provided with a plurality of radially outwardly opening slots 49 for receiving the rear end portions of rods 32 and said ring is suitably secured, as by welding, against an inwardly extending shoulder 50 of the motor casing 46. It will be understood that traps 42 and 47 are likewise adapted to be mounted in the motor casings 39 and 46, respectively, before said motor casings are connected to form a part of the rocket 12.

Motor casing 46 is provided with an internally threaded open rear end 51 which is threadedly engaged by a plug 52, which is recessed at its inner end and provided with an integral spider 53 in said recessed inner end. The plug 52 is provided with an opening 54 extending therethrough and opening into the recessed inner end thereof. Opening 54 is defined by frusto-conical end portions which converge toward one another to form a restricted intermediate portion. A valve 55 which is elongated and which is tapered from intermediate of its end in both directions, lengthwise thereof, to form substantially frusto-conical end portions, has one of said end portions seated in the outer end of the opening 54 for normally closing said opening. A shear pin 56 extends through a longitudinal bore 57 in the valve 55 and has a threaded inner end which engages a threaded opening 58 in the spider 53, for retaining the valve 55, under ordinary conditions, in a closed position, as seen in Figure 3. A tail fin assembly, designated generally 59, includes a hub 60, a plurality of radial vanes 61 and a rim 62. The hub 60 engages around the rear end of the motor casing 46 and is provided at its rear end with an inturned flange 63 which is clamped between the rear end of the casing 46 and an annular shoulder of the plug 52 for retaining the tail fin assembly 59 in position on the motor section 16. The rim 62 which encompasses and is disposed concentric to the hub 60, is connected thereto by the radial fins 61 which are each secured to the hub and rim in any suitable manner, as by welding. The plug 52 seats a plurality of pins 64 which project rearwardly therefrom and which are disposed to guide the valve 55 in its rearward movement, as will hereinafter be explained. As seen in Figure 4, the plug 52 is provided with a pair of openings 65 which extend lengthwise therethrough to receive lead wires, not shown, extending from a conventional electric igniter, not shown, disposed in one or more of the motor sections and which are adapted to be connected to a conventional firing circuit and source of electric current, not shown, disposed externally of the rocket 12.

From the foregoing, it will be obvious that when the powder sticks 26 of the motor chambers 14, 15 and 16 are ignited by the aforementioned igniter, the rocket 12 will be launched in a conventional manner. The exterior diameter of the tail fin assembly 59 is equal to that of the head 13 and the forward motor section 14, so that said parts will cooperate to guide the rocket 12 during launching from a tube or rails, not shown. Instead of the propelling gases, produced by the propellants 26, being released through a nozzle at the rear end of the motor chamber, as is conventional in rocket projectiles, the propelling gases from the three motor sections 14, 15 and 16 are normally emitted through the nozzles or jets, formed by the overlapped ends of the motor casings and the spacing elements 40, which nozzles or jets designated 66, are clearly illustrated in Figure 12. The jets, formed by the motor casings 22 and 39, accommodate the gases from the motor section 14 and the forward half of the motor section 15, and the jets formed by the motor casings 39 and 46 accommodate the propelling gases from the rear half of motor section 15 and the entire rear motor section 16 to thereby distribute the discharge of the gases substantially equally throughout the length of the motor chamber, to prevent a building up of an excess gas pressure at the rear end of the motor chamber, relatively to the forward end. The shape of the spacing elements 40 combined with the overlapping motor section portions to form the jets 66 which are so shaped as to form venturi. It will be readily apparent that the present construction of motor chamber permits the use of a greatly increased amount of propellant, due to the increased discharge capacity of the chamber, so that the range, velocity and payload of the rocket can be substantially increased. By merely canting the spacing elements 40, as illustrated in Figure 8, instead of having said elements disposed lengthwise of the rocket, the venturi 66 will be canted uniformly to cause rotation of the rocket in flight to increase its stability and accuracy.

Should an excess pressure build up in the rear motor section 16, the excess pressure thus produced, rather than rupturing said motor section, will shear the enlarged rear end of the shear pin 56 to thereby permit a rearward movement of the valve 55, on the pin 56 and guided by the pins 64 to unseal the opening 54 which, due to its shape, will then function as an additional venturi at the trailing end of the rocket 12 to release this additional gas pressure and to function in the same manner as the single venturi of conventional rockets.

Figures 9, 10 and 11 illustrate a slight modification of the rocket previously described, and disclose a rocket, designated generally 67, of a construction which is intended for use with rockets of larger sizes such as the 7.2 inch and the 10 inch rocket. The rocket 67 includes a head 68, a forward motor section 69, an intermediate motor section 70 and a rear motor section 71. The head 68 differs from the head 13 in that the entire charge of high explosive is contained within the chamber of the head and the burster tube of the rocket 12 is dispensed with in order to provide additional motor chamber area for the rocket propellant. Another construction of trap is provided for the rocket 67 to take care of the increased propellant utilized and, as shown in Figure 9, the trap 72 of the forward motor section 69 includes a forward anchor plate or disk 73 which is suitably secured in any manner to the casing of the motor section 69 and which is spaced from the rear end of the head 68 by a gasket 74. A plurality of trap rods 75 have their forward ends anchored in the disk 73 and project rearwardly therefrom. Said trap rods are arranged in concentric rings, as best illustrated in Figure 11. The trap rods 75, at a plurality of corresponding positions throughout their lengths and at their rear ends, are provided with enlargements 76 for mounting retaining rings 77 on the rods 75. The retaining rings 77 are substantially semicircular or channel shaped in cross section, as seen in Figure 9, and are provided with transverse slots 78 extending substantially half way therethrough for receiving the rods 75, for detachably mounting the ring members 77 thereon. Ring members 77 form retaining means for the rear end of the trap 72 and the spacing means, at a plurality of points throughout the length of the trap, for spacing the individual powder sticks or grains 79, which are mounted on the rods 75. One set of enlargements 76 also function for spacing the forward powder sticks 79 from the anchor disk 73. The intermediate motor chamber 70 is provided with a slightly different powder trap construction, designated generally 80. The difference being characterized principally by the fact that due to the reduced diameter of the motor section 70, as compared to the motor section 69, the number of concentric rings of powder sticks 79 which can be employed, is reduced. The only other difference in the powder trap 80 over the powder trap 72 is that an annular anchoring collar 81 is substituted for the anchor disk 73 and is provided with a flange 82 which seats against the forward end of the casing of the motor section 70. The collar 81 is likewise secured in any suitable manner to the forward end of the casing of the motor section 70 and has the forward ends of the rods 75 of the trap 80 anchored therein for providing a support for trap 80. The central opening 83 of the collar 81 provides a communicating passage between the motor sections 69 and 70. The rear motor section 71 is provided with a powder trap 84, mounted in the same manner and constructed in the same way as the powder trap 80, and differing therefrom only in that it contains fewer, and in the present disclosure of the invention, by a single ring of powder sticks 79.

The casings of the motor chambers 69, 70 and 71 are connected together in the same manner as the motor sections of the rocket 12 by the spacing elements 40 and rivets 41 to form the venturi 66.

The rear end of the rocket 67 differs slightly from that of the rocket 12 in that the plug 52 and its associated parts are replaced by a venturi 85 having a threaded neck 86 which engages the internally threaded rear end 87 of the casing of the motor section 71. The casing of the motor section 71 is provided with an internal flange 88 which combines with the neck 86 to seat a blowout disk 89. The tail fin assembly 90 differs from the tail fin assembly 59 only in that the fins thereof are riveted to the hub and rim.

The operation of the rocket 67 is substantially the same as that of the rocket 12 and as previously described, except that it will be readily apparent that the increased motor chamber area provided by the increased diameter of the rocket plus the increased area afforded by the omission of the burster tube, permits the accommodation of a substantially increased quantity of propellants to thus materially increase the range, velocity and payload capacity of the rocket 67. The tail fin assembly 90 functions in the same manner as the tail fin 59 in not only guiding the rocket in flight but in guiding it, in conjunction with the head and forward motor chamber, in launching. As in the rocket 12, the spacing elements 40 may be uniformly canted to cant the venturi 66 to thereby produce a rotation of the rocket in flight. The blowout disk 89 will be ruptured in case an excess press is built up in the rear motor chamber 71 to open the venturi 85, which will then function in the same manner as a conventional venturi of a rocket, for discharging the excess propelling gases.

While both the rockets 12 and 67 have been illustrated and described as provided with a motor chamber composed of three motor sections of different diameters, it is to be understood that it is contemplated to construct rockets in accordance with the invention having motor chambers composed of two motor sections or four or more motor sections without in any way varying the construction as heretofore described and illustrated in the drawings.

In lieu of the spacing elements 40, an integral or otherwise suitably constructed spacing member, designated generally 91 and illustrated in Figures 13 and 14, may be substituted for the members 40. The spacing member 91 comprises a collar or ring having openings 92 formed therein and transversely of the circumference thereof which are shaped to define venturi of the same shape as the venturi 66 and which form connecting portions 93 therebetween of the same shape as the spacing elements 40, as clearly illustrated in Figure 14. The spacing members 91 are made of the correct interior and exterior diameters and radial thickness to fit snugly into the annular space formed between the concentric overlapping portions of adjacent motor section casings and are adapted to be secured therein in any suitable manner as by welding or by means of fastenings, such as the rivets 41 which will extend through the portions 93.

In Figure 15 a slightly modified form of spacing member, designated generally 94, is disclosed. The spacing member 94 differs from the spacing member 91 in that the venturi 95 thereof in addition to opening outwardly of the radial sides of the member 94 also open outwardly of the circumference thereof and the outer wall of the jets or venturi 95 are defined by the surrounding portion of the casing, indicated in Figure 15 by the reference numeral 96, which encompasses the member 94. The venturi 95 form the radial portions 97, which correspond to the portions 93, and the member 94 is mounted in the same manner and functions in the same way as the member 91. Obviously, if desired, the venturi 92 and 95 could be canted to produce a rotation of the rocket, in flight, with which they are used.

Various other modifications and changes in addition to those herein shown and described are contemplated and may obviously be resorted to, without departing from the spirit and scope of the invention as hereinafter defined by the appended claims, wherein only the preferred embodiments of the invention have been disclosed.

I claim:

1. A step-motor rocket comprising a head, three tubular motor sections alined with said head, said sections being of different diameters with the largest diameter section secured to the head and with the smallest diameter section forming the stern end of the rocket, rearwardly directed nozzles between said motor sections, and a cage-type powder trap secured in each of said sections, the trap in said forward section being supported from its forward end, the trap in said stern section being supported from its stern end.

2. A step-motor rocket comprising a head, three tubular motor sections alined with said head, said sections being of different diameters with the largest diameter section secured to said head and with the smallest diameter section forming the stern of the rocket, rearwardly directed nozzles between said motor sections, a normally closed pressure relief valve in the rear end portion of said smallest diametered motor section, and means holding said relief valve in closed position, said last-named means being shearable in response to a predetermined pressure in said rear end portion to thereby open said valve.

3. A step-motor rocket comprising first, second and third hollow cylindrical motor chambers of progressively smaller diameters, means forming venturi passages and securing the forward ends of said second and third chambers within and in overlapping relation with the rear ends of said first and second motor chambers respectively, a powder trap fixedly carried by and within each said chamber, there being a gas discharge passageway through the rear end of said third chamber, means closing said passageway but operable to open the same in response to a predetermined gas pressure within said third chamber.

4. In a rocket, a hollow cylindrical motor chamber, a hollow, explosive-containing head secured in and closing the forward end of said chamber, a collar having circumferentially spaced apertures and rigidly engaged with the portion of said head within said chamber, a plurality of trap rods each having one end fixed in a respective aperture, and means uniting the other ends of said rods to maintain all said rods in substantially parallel relation, said last-named means comprising first and second adjacent coaxial rings, said first ring having radial slots extending inwardly from the outer periphery thereof, said second ring having radial slots extending outwardly from the inner periphery thereof, each said rod passing through a radial slot in each said ring.

5. In a rocket, a hollow cylindrical motor chamber, a powder trap in said chamber including a plurality of circumferentially-spaced parallel trap rods on each of which a powder grain is strung, first and second adjacent coaxial rings in said chamber, said first ring having a plurality of radial slots extending inwardly from the outer periphery thereof, said second ring having a plurality of radial slots extending outwardly from the inner periphery thereof, each slot of one ring coinciding with and overlapping, by the diametral dimension of said rods, a corresponding slot of the other ring, when said rings are coaxial, each said rod passing through a pair of coinciding slots, whereby all rods are held in fixed relation, and means carried by each rod to prevent axial movement of each ring in one direction therealong.

CLARENCE N. HICKMAN.

REFERENCES CITED

The following references are of record in the file of this patent:

UNITED STATES PATENTS

| Number | Name | Date |
|---|---|---|
| 2,402,809 | Farr | June 25, 1946 |

FOREIGN PATENTS

| Number | Country | Date |
|---|---|---|
| 11,705 | France | Oct. 5, 1844 |
| 73,840 | Germany | Mar. 9, 1894 |
| 831,496 | France | June 7, 1932 |
| 375,260 | Italy | Sept. 29, 1939 |
| 516,865 | Great Britain | Jan. 12, 1940 |